(12) United States Patent
Ahern et al.

(10) Patent No.: US 8,176,081 B2
(45) Date of Patent: May 8, 2012

(54) FORMS INTEGRATION OF AN EXTERNAL DATA MODEL NOT IMPLEMENTED THROUGH A DOCUMENT OBJECT MODEL (DOM) ACCESSIBLE APPLICATION PROGRAMMING INTERFACE (API)

(75) Inventors: Michael I. Ahern, Allston, MA (US); Derek W. Carr, Cary, NC (US); Carol A. Jones, Raleigh, NC (US); Ajamu A. Wesley, Concord, MA (US); Cesar A. Wong, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 11/282,354

(22) Filed: Nov. 18, 2005

(65) Prior Publication Data

US 2007/0118538 A1    May 24, 2007

(51) Int. Cl.
*G06F 7/00* (2006.01)
(52) U.S. Cl. ........................................ 707/790
(58) Field of Classification Search ................. 707/790
See application file for complete search history.

(56) References Cited

U.S. PATENT DOCUMENTS

| | | | |
|---|---|---|---|
| 5,694,598 A * | 12/1997 | Durand et al. ................. | 1/1 |
| 6,718,516 B1 | 4/2004 | Claussen et al. | |
| 6,865,599 B2 * | 3/2005 | Zhang .......................... | 709/218 |
| 7,392,264 B2 * | 6/2008 | Lord et al. .................. | 707/104.1 |
| 2002/0078105 A1 | 6/2002 | Hamada et al. | |
| 2003/0229900 A1 * | 12/2003 | Reisman ......................... | 725/87 |
| 2004/0003341 A1 | 1/2004 | AlSafadi et al. | |
| 2004/0133635 A1 | 7/2004 | Spriestersbach et al. | |
| 2004/0168124 A1 | 8/2004 | Beisiegel et al. | |
| 2004/0201600 A1 | 10/2004 | Kakivaya et al. | |
| 2004/0205554 A1 | 10/2004 | Goswami et al. | |
| 2004/0230903 A1 | 11/2004 | Elza et al. | |
| 2005/0055369 A1 * | 3/2005 | Gorelik et al. ................. | 707/102 |

* cited by examiner

*Primary Examiner* — Fazlul Quader
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to deploying XForms in an enterprise environment and provide a method, system and computer program product for forms integration of an external data model not implemented through a DOM accessible API. In one embodiment of the invention, a method for forms integration of an external data model not implemented through a DOM accessible API can include generating a data graph for an external data model for a forms based application and transforming the data graph into a DOM representation of the data graph. Value changes for fields of a form in the forms based application can be applied to nodes of the DOM representation and mutations in the nodes of the DOM representation can be synchronized to corresponding nodes in the data graph.

14 Claims, 3 Drawing Sheets

FORMS INTEGRATION OF AN EXTERNAL DATA MODEL NOT IMPLEMENTED THROUGH A DOCUMENT OBJECT MODEL (DOM) ACCESSIBLE APPLICATION PROGRAMMING INTERFACE (API)

BACKGROUND OF THE INVENTION

1. Field of the Invention

The present invention relates to the field of forms processing in a data driven system and more particularly to managing an external data model not implemented through a document object model (DOM) accessible application programming interface (API).

2. Description of the Related Art

Form based input is the enabling technology which permits the widespread distribution of applications across generic client platforms such as the conventional content browser. In the prototypical distributed application, a markup language defined interface can form the principal conduit through which end users can interact with backend application logic. Often configured in the form of a Web page, the interface can be provided to the content browser by a content server and can take the form either of a pre-defined static page, or a dynamically generated page. Form input fields can be positioned within the interface through which user input can be accepted and posted to the backend application logic for further processing.

Despite the flexibility afforded by hypertext markup language (HTML) defined forms, HTML defined forms mix data, logic and presentation in contravention of standard programming practices. In this regard, the well-known model-view-controller paradigm demands that each of data, logic presentation remain separable. In this way, though the presentation layer may change to suit the user interface requirements of an end user, the underlying logic layer need not also change. To accommodate the increasing complexity of transactions conducted through forms, the XForms specification has been proposed as a presentation independent way of handling interactive Web transactions. Significantly, the XForms specification separates data and logic from presentation in that XForms utilizes the extensible markup language (XML) for data transport and HTML for data display.

An XForms processor commonly has been implemented as a specialized DOM parser agent where the XForm is realized as a DOM document. Specifically, the Xforms processing model is defined through the propagation of DOM events. Accordingly, the XForms specification defines a normative binding for uniform resource identifier (URI) accessible data having an XML representation. The normative binding can utilize a standardized hypertext transfer protocol (HTTP) URI scheme. Thus, the XForms specification presupposes the use of an external data model which is implemented according to a DOM accessible API.

Notwithstanding, trends in data driven computing have embraced a data model which has not been implemented according to a DOM accessible API. Specifically, service data objects (SDO) provide a framework for data application development, which includes an architecture and API. SDO supports compound data objects as a graph of data objects which incorporate a change history for each node of the graph. In this regard, SDO client modifications of the data graph are reflected in an internal change summary data structure. In operation, upon submission of a modified SDO graph, a data mediator service propagates the changes specified by the change summary to the ultimate data source.

It will be apparent to the skilled artisan that SDO simplifies the data programming model in object oriented computing and abstracts data in a service oriented architecture (SOA). SDO further unifies data application development and supports and integrates XML. Thus, SDO provides an advanced and able data model for supporting enterprise class data driven applications. Yet, SDO does not implement a DOM accessible API. Accordingly, enterprise class data driven applications cannot fully exploit the XForms processing model.

BRIEF SUMMARY OF THE INVENTION

Embodiments of the present invention address deficiencies of the art in respect to deploying XForms in an enterprise environment and provide a novel and non-obvious method, system and computer program product for forms integration of an external data model not implemented through a DOM accessible API. In one embodiment of the invention, a method for forms integration of an external data model not implemented through a DOM accessible API can include generating a data graph for an external data model for a forms based application and transforming the data graph into a DOM representation of the data graph. Value changes for fields of a form in the forms based application can be applied to nodes of the DOM representation and mutations in the nodes of the DOM representation can be synchronized to corresponding nodes in the data graph.

In another embodiment of the invention, a data processing system for forms integration of an external data model not implemented through a DOM accessible API can include a markup language document comprising a form for a forms based application and a resource identifier disposed in the form. The resource identifier can include a reference to a data mediator command and associated metadata. As such, the system also can include a data mediator coupled to the form and enabled to transform a data graph for an external data model for the forms based application into a DOM representation of the data graph. Finally, the system can include an event listener registered for the DOM representation to detect mutations in target nodes of the DOM representation and to synchronize the mutations with corresponding nodes in the data graph.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for the forms integration of an external data model not implemented through a DOM accessible API. In accordance with an embodiment of the present invention, data within a markup language defined form, for example an XForm, can be submitted for processing. Responsive to the submission, a network address of a handler, such as a URI, can be identified within the markup language defining the form. The handler also can include metadata referencing a data mediator for an external data model. Subsequently, the referenced data mediator can be invoked to produce a data graph for the external data model, for instance an SDO data graph.

The resulting data graph can be converted to a DOM representation through the traversal of the SDO data graph. As one example, the SDO data graph can be traversed through the use of XML path language (XPATH) expressions. Once the DOM representation has been created, an event listener can be registered for the root node of the DOM representation. Whenever an event is handled by the event listener arising from a modification to the value of a target node in the DOM representation, the event can be inspected to identify the target node. Consequently, the data graph can be traversed to the node corresponding to the target node in the DOM representation and the modification can be applied to the corresponding node in the data graph. In this way, changes to the DOM representation of the external model can be reflected in the data graph of the external data model in a seamless manner.

Figure 1:
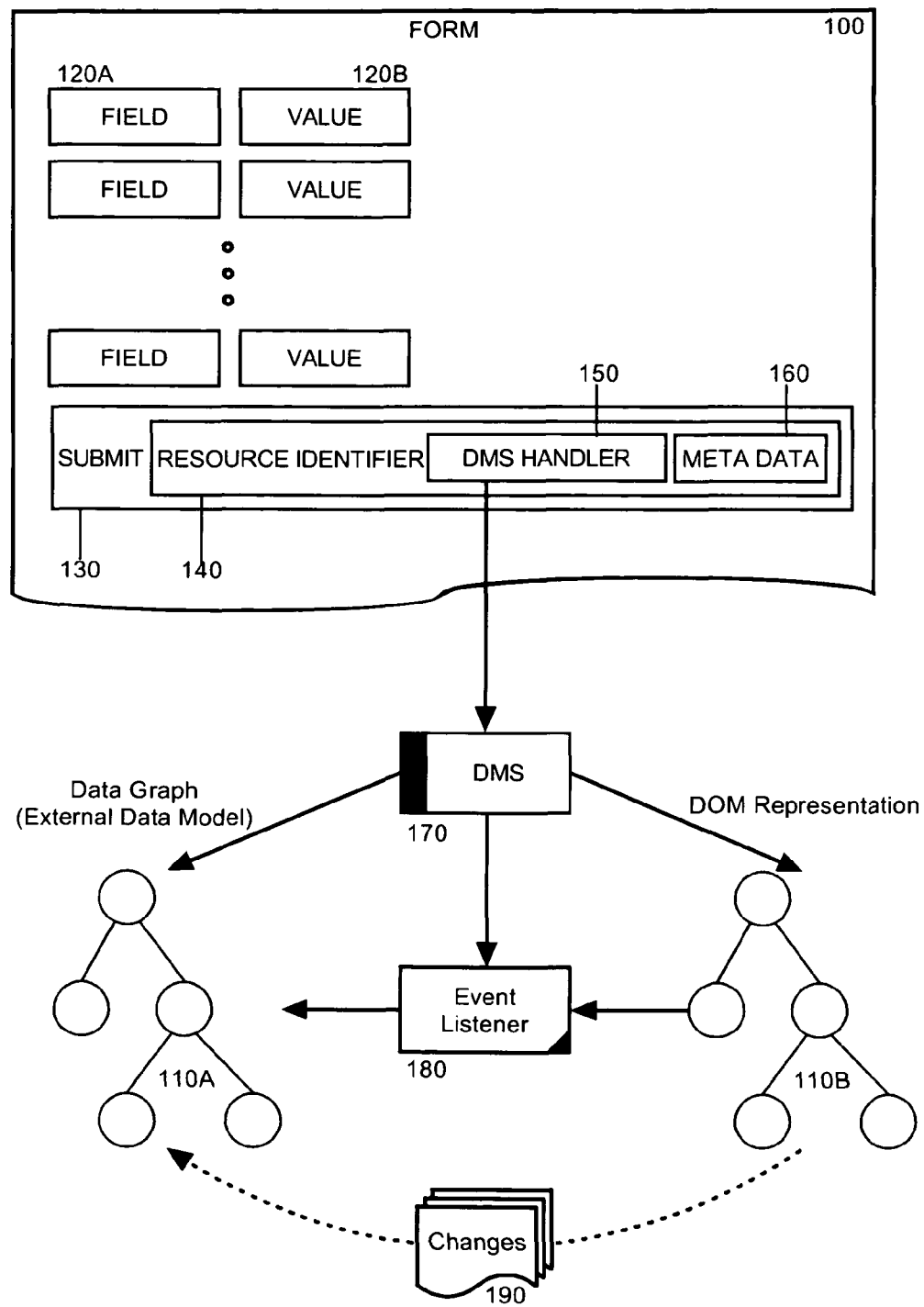
FIG. 1 is a pictorial illustration of a process for the forms integration of an external data model not implemented through a DOM accessible API.

In illustration, FIG. 1 is a pictorial illustration of a process for the forms integration of an external data model not implemented through a DOM accessible API. As shown in FIG. 1, a form 100 can be defined in markup to include one or more fields 120A configured to accept one or more corresponding values 120B. An end user can interact with the form 100 and, at the discretion of the end user, the values 120B of the form 100 can be submitted to application logic through the selection of a submit control 130 disposed in form 100. The submit control can specify a resource identifier which can include a reference 150 to a data mediation service (DMS) handler 150 and associated metadata 160.

The DMS 170 can include a configuration for receiving one or more commands for manipulating an external data model. In particular, the DMS 170 can include program code enabled to generate a data graph 110A for the external data model. The data graph 110A can include, for example, an SDO data graph for the external data model. The program code of the DMS 170 further can be enabled to transform the data graph 110A into a DOM representation 110B of the data graph 110A. For instance, each node of the data graph 110A can be traversed to identify nodes to be transformed into corresponding nodes in the DOM representation 110B. Notably, XPATH expressions can be applied to traverse the data graph 110A.

Once the DOM representation 110B has been produced, an event listener 180 can be registered for the root node of the DOM representation 110B. The event listener 180 can include a configuration for detecting changes 190 to the nodes of the DOM representation 110B. Responsive to the detection of a change for a node of the DOM representation 110B, the event listener 180 can identify the target node for the change in the DOM representation 110B and the event listener 180 can locate a corresponding node in the data graph 110A. Subsequently, the event listener 180 through the DMS 170 can apply the change to the data graph 110A. In this way, the form 110 can integrate with the data graph 110A despite the data graph 110A not implementing a DOM accessible API.

Figure 2:
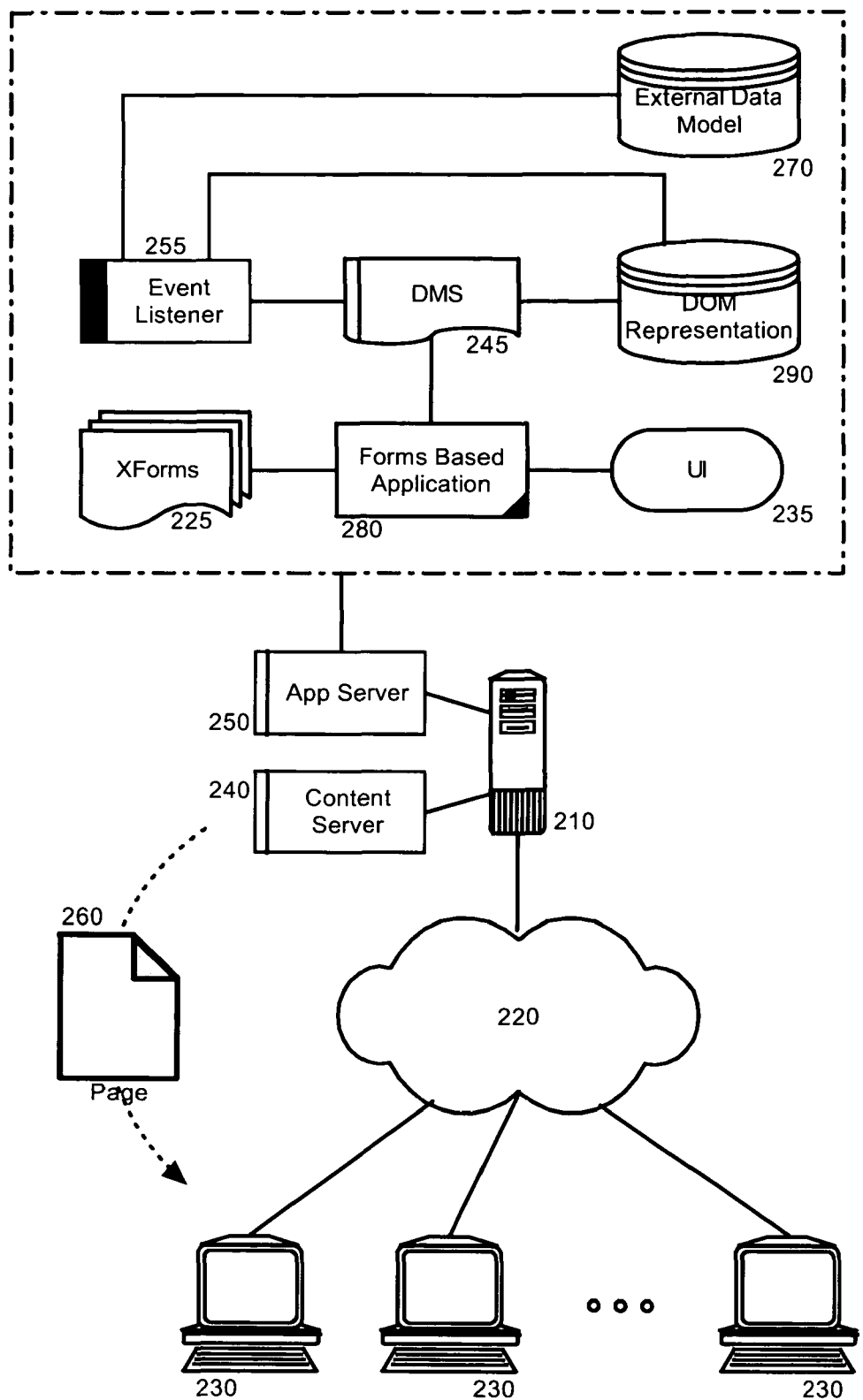
FIG. 2 is a schematic illustration of a data processing system configured for forms integration of an external data model not implemented through a DOM accessible API; and, FIG. 3 is a flow chart illustrating a process for the forms integration of an external data model not implemented through a DOM accessible API.

In further illustration, FIG. 2 is a schematic illustration of a data processing system configured for forms integration of an external data model not implemented through a DOM accessible API. The data processing system can include a host computing platform 210 coupled to one or more client computing platforms 230 over a data communications network 220. The host computing platform 210 can include a content server 240 and an application server 250 operable coupled to one another to provide a forms based application 280 and a user interface 235 to the forms based application 280 to end users interacting with the forms based application 280 through the client computing platforms 230.

The data processing system further can include a DMS 245 coupled to the forms based application 208. The DMS 245 can include one or more logical commands enabled to produce a DOM representation 290 of an external data model 270 for the forms based application 280. Additionally, the DMS 245 can include logic enabled to register an event listener 255 for the DOM representation 290. As XForms directives 225 for the forms based application 280 render mutations to nodes of the DOM representation 290, the event listener 255 can locate corresponding nodes of the external data model 270 in order to propagate the mutations to the corresponding nodes of the external data model 270.

Figure 3:
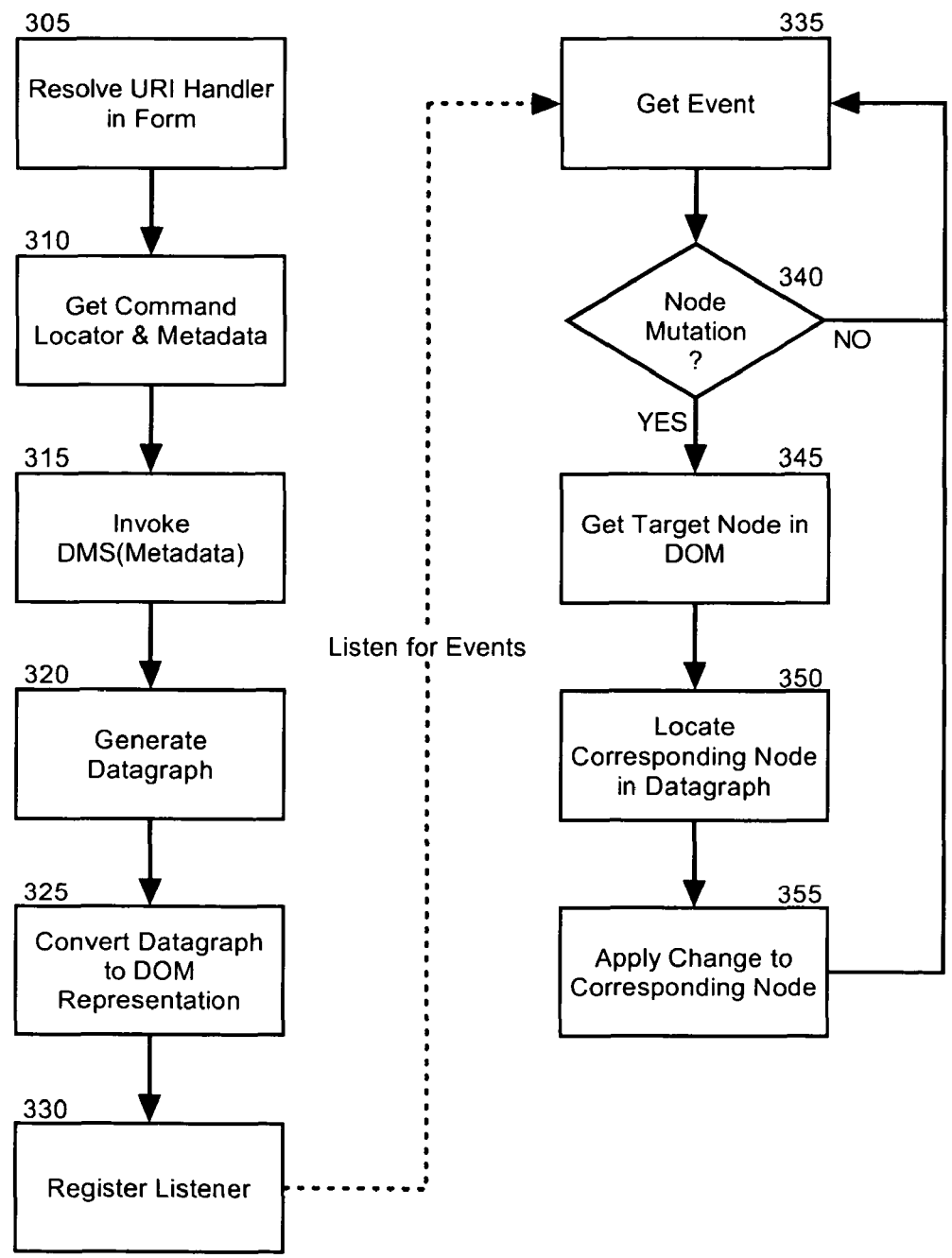

In more particular illustration, FIG. 3 is a flow chart illustrating a process for the forms integration of an external data model not implemented through a DOM accessible API. Beginning in block 305, a URI handler can be resolved within an XForm specified form defined form in markup. The URI handler can refer to a DMS mediator and command and in block 310, the DMS command and associated metadata can be retrieved from the URI handler. As an example, the URI handler can be expressed within an XForm source attribute of an instance element as follows:

<xforms:instance src="command-file:///path/
    command#paramaters"

where the "path/command" is the DMS mediator and command, and "parameters" are the associated metadata.

Subsequently, the retrieved command located can be invoked in the DMS mediator with parameters specified by the associated metadata. In consequence of the invocation, an SDO data graph can be generated for an external data model. As such, in block 325, the data graph can be converted to a DOM representation by traversing the nodes of the data graph and writing corresponding nodes in the DOM representation. Finally, in block 330, an event listener can be registered for the root node of the DOM representation. Specifically, the event listener can listen for events indicating a mutation to a node of the DOM representation resulting from value changes in the XFORM.

In block 335, an event can be received in the event listener. In decision block 340, if the event is a node mutation event, in block 345 the target node in the DOM representation for the mutated node can be determined. In block 350, a corresponding node in the SDO data graph for the target node in the DOM representation can be located. Finally, in block 355, the mutation can be applied to the SDO data graph through the DMS mediator. In this way, interactions with the XFORM can be processed in an external data model, even though the external data model does not implement a DOM accessible API.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for forms integration of an external data model not implemented through a document object model (DOM) accessible application programming interface (API), the method comprising:
   generating a data graph for an external data model for a forms based application;
   transforming the data graph into a DOM representation of the data graph;
   applying value changes for fields of a form in the forms based application to nodes of the DOM representation; and,
   synchronizing mutations in the nodes of the DOM representation to corresponding nodes in the data graph.

2. The method of claim 1, where generating a data graph for an external data model for a forms-based application, comprises generating a services data object (SDO) data graph for the external data model.

3. The method of claim 1, wherein generating a data graph for an external data model for a forms based application, comprises generating a services data object (SDO) data graph for the external data model for an XForm specified forms-based application.

4. The method of claim 1, wherein transforming the data graph into a DOM representation of the data graph, comprises traversing the data graph using extensible markup language (XML) path language (XPATH) expressions to transform each node of the data graph into a node in the DOM representation.

5. The method of claim 1, wherein synchronizing mutations in the nodes of the DOM representation to corresponding nodes in the data graph, comprises:
   registering an event listener for a root node of the DOM representation; and,
   responsive to detecting a mutation in a target node of the DOM representation, locating a corresponding node in the data graph and applying the mutation to the corresponding node in the data graph.

6. A data processing system for forms integration of an external data model not implemented through a document object model (DOM) accessible application programming interface (API), the system comprising:
   a markup language document comprising a form for a forms based application;
   a resource identifier disposed in the form, the resource identifier comprising a reference to a data mediator command and associated metadata;
   a data mediator coupled to the form and enabled to transform a data graph for an external data model for the forms based application into a DOM representation of the data graph; and,
   an event listener registered for the DOM representation to detect mutations in target nodes of the DOM representation and to synchronize the mutations with corresponding nodes in the data graph.

7. The system of claim 6, wherein the form is an XForm specified form.

8. The system of claim 6, wherein the data mediator is a data mediation system (DMS) handler.

9. The system of claim 6, wherein the data graph is a services data object (SDO) data graph.

10. A computer program product comprising a computer usable medium having computer usable program code for forms integration of an external data model not implemented through a document object model (DOM) accessible application programming interface (API), the computer program product including:
    computer usable program code for generating a data graph for an external data model for a forms based application;
    computer usable program code for transforming the data graph into a DOM representation of the data graph;
    computer usable program code for applying value changes for fields of a form in the forms based application to nodes of the DOM representation; and,
    computer usable program code for synchronizing mutations in the nodes of the DOM representation to corresponding nodes in the data graph.

11. The computer program product of claim 10, wherein the computer usable program code for generating a data graph for an external data model for a forms-based application, comprises computer usable program code for generating a services data object (SDO) data graph for the external data model.

12. The computer program product of claim 10, wherein the computer usable program code for generating a data graph for an external data model for a forms based application, comprises computer usable program code for generating a services data object (SDO) data graph for the external data model for an XForm specified forms-based application.

13. The computer program product of claim 10, wherein the computer usable program code for transforming the data graph into a DOM representation of the data graph, comprises computer usable program code for traversing the data graph using extensible markup language (XML) path language (XPATH) expressions to transform each node of the data graph into a node in the DOM representation.

14. The computer program product of claim 10, wherein the computer usable program code for synchronizing mutations in the nodes of the DOM representation to corresponding nodes in the data graph, comprises:

computer usable program code for registering an event listener for a root node of the DOM representation; and, computer usable program code for responsive to detecting a mutation in a target node of the DOM representation, locating a corresponding node in the data graph and applying the mutation to the corresponding node in the data graph.

* * * * *